UNITED STATES PATENT OFFICE.

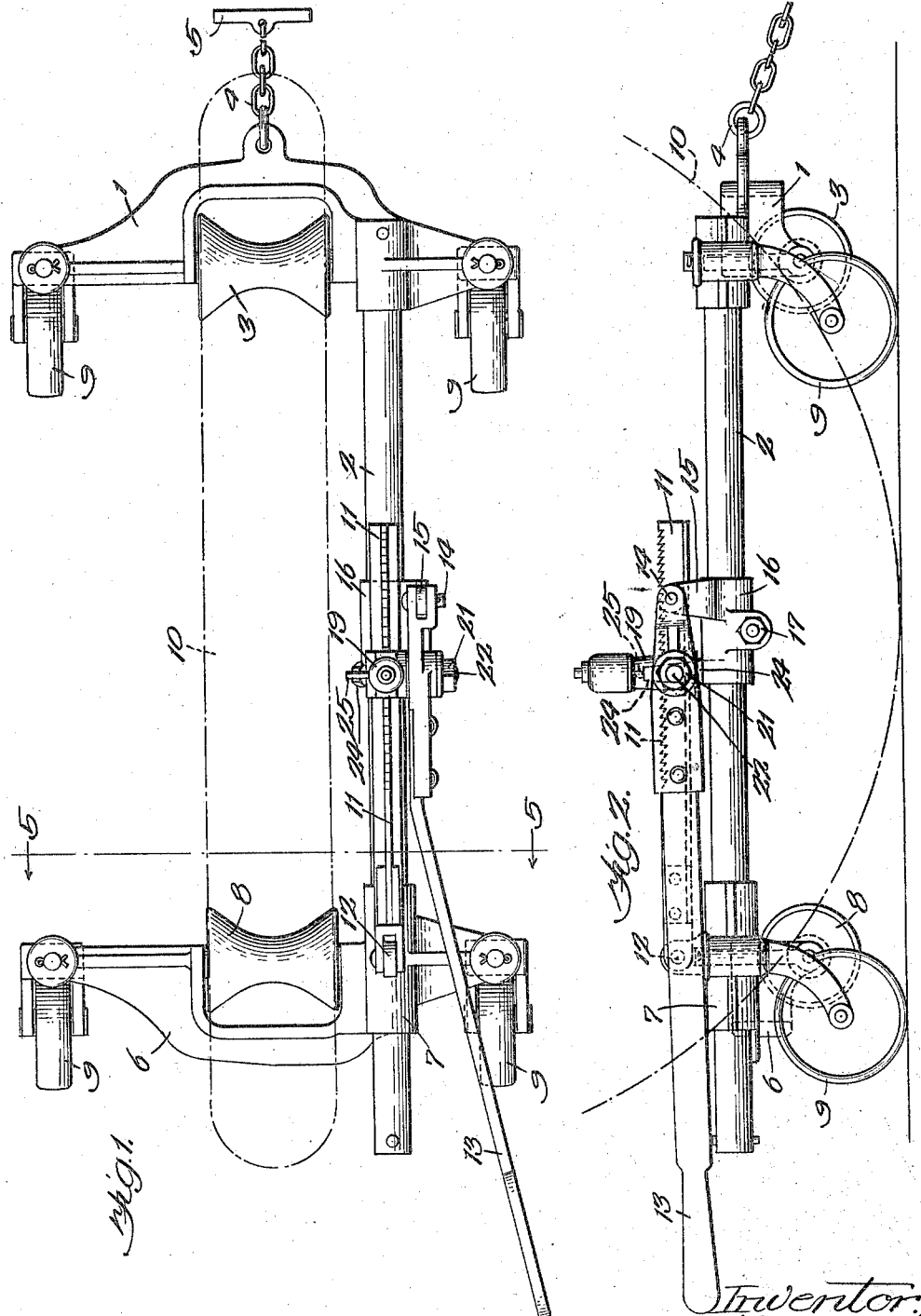

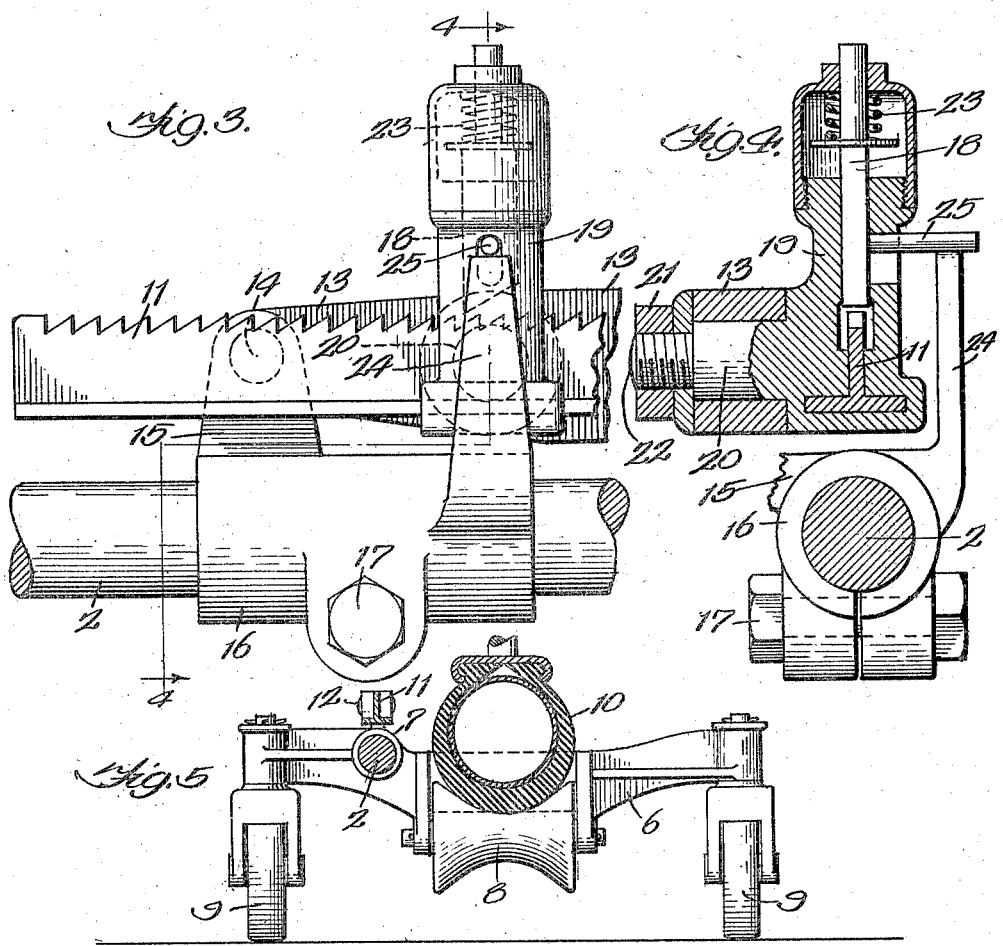
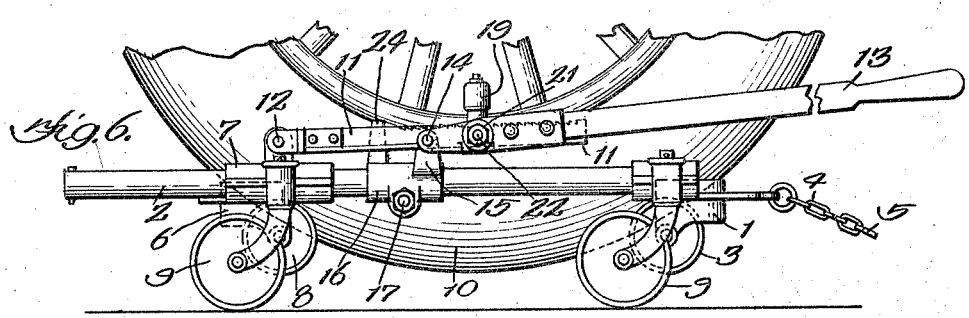
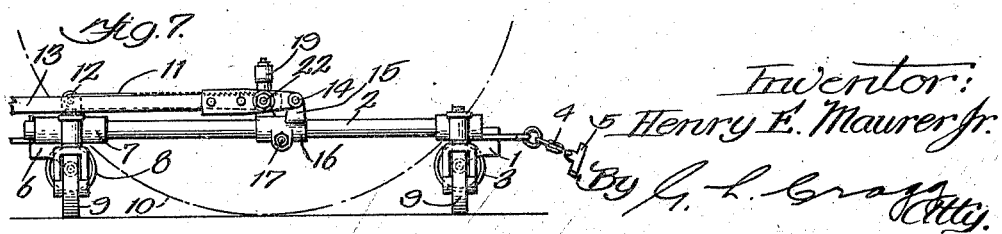

HENRY E. MAURER, JR., OF SPRINGFIELD, ILLINOIS, ASSIGNOR OF ONE-HALF TO HARRY L. IDE, OF SPRINGFIELD, ILLINOIS.

LIFTING-JACK.

1,275,716.  Specification of Letters Patent.  Patented Aug. 13, 1918.

Application filed January 21, 1918. Serial No. 212,940.

*To all whom it may concern:*

Be it known that I, HENRY E. MAURER, Jr., citizen of the United States, residing at Springfield, in the county of Sangamon and State of Illinois, have invented a certain new and useful Improvement in Lifting-Jacks, of which the following is a full, clear, concise, and exact description.

My invention relates to lifting jacks and has for one of its objects the provision of a jack which may readily be positioned with respect to the load supported thereby without shifting the load.

The invention has for another of its objects the employment, in a jack, of two load supporting members in combination with improved mechanism for effecting movement of at least one of the load supporting members toward the other to lift the load, reverse operation of this mechanism serving to lower the load.

In the preferred embodiment of my invention a side piece connects one end of one load supporting member with one end of the other load supporting member, the remaining ends of said load supporting members being disconnected to afford a gap therebetween in which the load to be supported may be received and permitting movement of the side piece toward the load to adjust the load receiving positions of the load supporting members without the necessity of shifting the load to adapt it to the load supporting members, one of the load supporting members being slidable on the side piece toward and from the other load supporting member by means of a lever having a fulcrum supported by the side piece.

In this preferred embodiment of the invention a rack bar is pivotally connected with the movable load supporting member and extends longitudinally of the side piece, there being a bar engaging member or pawl engageable with the teeth of the rack bar and operable by the lever mechanism to draw the rack bar longitudinally of the frame piece to direct movement of the movable load supporting member longitudinally of the side piece. In order that the load supporting members may be readily adapted to the load without the necessity of working the lever mechanism there is provided a pawl disengaging device adjusted to function by said lever mechanism when in idle position to normally disengage the pawl from the rack bar and thereby dissociate the rack bar from the lever mechanism in order that the movable load supporting member may be moved independently of the lever mechanism.

The jacks of my invention are of particular service in supporting automobiles or wheels thereof. One jack is employed for each wheel that is to be supported and when the entire automobile is to be supported there are four jacks in use, one for each of the wheels. Each jack is desirably supported upon casters that constitute such jack a small truck and when the four wheels of the automobile are supported in elevated positions upon these small trucks, the automobile may readily be rolled around in limited space. The jacks of my invention are, consequently, of particular service when used in garages as an automobile supported thereby may readily be moved around in the limited spaces in which automobiles are usually disposed when located in garages.

I will explain my invention more fully by reference to the accompanying drawings showing the preferred embodiment thereof and in which Figure 1 is a plan view of a lifting jack constructed in accordance with the preferred embodiment of the invention, this figure showing the movable load supporting member moved to a load engaging position independently of the lever; Fig. 2 is a view in elevation of the structure as it appears in Fig. 1, the dot and dash lines in Figs. 1 and 2 representing a portion of an automobile vehicle wheel engaged by the load supporting members preparatory to the elevation of the wheel; Fig. 3 is a detail view of a part of the structure as it appears in Fig. 2 but on a larger scale and taken from the other side; Fig. 4 is a sectional view on line 4—4 of Fig. 3; Fig. 5 is a sectional view on line 5—5 of Fig. 1; Fig. 6 is a view in elevation, on a smaller scale than is employed in Fig. 2, showing the jack adjusted to elevate a vehicle wheel of the automobile; and Fig. 7 is a view in elevation illustrating the initial adjustment of a jack in which adjustment it may readily be slipped into position beneath a vehicle wheel.

Like parts are indicated by similar characters of reference throughout the different figures.

One of the two load supporting members in the jack of my invention includes an end piece 1 rigidly secured to and projecting laterally from the side piece 2. The portion of this load supporting member that is directly engageable with the load is desirably in the form of a roller 3 mounted to rotate in the end piece 1 to have an axis of rotation that is at right angles to the side piece 2. A pulling chain 4 having a gripping bar 5 may be attached to the end piece 1 whereby the jack may be pulled about. The other load supporting member includes an end piece 6 slidably mounted upon and projecting laterally from the side piece 2, the end piece 6 having a sleeve 7 surrounding the side piece 2 and having sliding engagement therewith. The portion of this load supporting member that is directly engageable with the load is also desirably in the form of a roller 8 mounted to rotate in the end piece 6 to have an axis of rotation that is at right angles to the side piece 2. The end pieces 1 and 6 are supported upon casters 9 that permit the jack to be readily moved about either when supporting a load or when being adjusted to load supporting position.

When the load supporting members are made up in part of the rollers 3 and 8 for the purpose of engaging automobile vehicle wheels these rollers are desirably made concave as illustrated. The side piece 2 connects one end of one load supporting member with one end of the other load supporting member, the remaining ends of these load supporting members being disconnected to afford a gap therebetween in which the load to be supported, such as an automobile vehicle wheel 10, may be initially received (Fig. 7) and permitting movement of the side piece toward the automobile vehicle wheel or other load until the rollers 3 and 8 are in the plane of such wheel or load. After the rollers are brought into the plane of the vehicle wheel they are both engaged with the vehicle wheel by pushing the portion 6 of the load supporting member that is movable upon the side piece 2 toward the other load supporting member, the casters readily permitting both rollers 3 and 8 to be brought into snug engagement with the load. After the rollers have been thus adjusted mechanism, presently to be described, is brought into play to effect further approach of the rollers that will effect the elevation of the automobile wheel 10 as illustrated in Fig. 6.

A rack bar 11 has pivotal connection at 12 with the movable load supporting member and extends longitudinally of the side piece 2. A hand lever 13 has its fulcrum 14 provided upon the bracket 15 that projects vertically from the split sleeve 16 which is clamped to the bar or side piece 2 by means of the clamping bolt 17. This lever 13 carries a bar engaging member in the form of a pawl 18 through the intermediation of a pawl carrier 19 that is pivotally mounted upon the lever 13 as indicated clearly in Fig. 4 where I have shown a wrist extension 20 of the pawl carrier passing through the lever 13 and held in assembly therewith by the nut 21 that is threaded upon the bolt extension 22 of the wrist 20. A spring 23, when free to act, serves to depress the pawl 18 into engagement with the teeth of the rack 11. It will be observed that the wrist 20 and the fulcrum 14 are spaced apart a distance similar to the distance between the fulcrum 14 and an upright post 24 which is also carried by the split sleeve 16. When the lever is in its idle position a pin 25, carried by the pawl 18, engages the top of the post 24, this post being long enough to elevate the pawl 18 out of engagement with the rack 11 and against the force of the spring 23. Because the pawl disengaging device is thus adjusted to function when the lever is in its idle position the rack bar 11 has nothing to impede its movement longitudinally of the bar or side piece 2 on which account the movable load supporting member may be moved along the side piece 2 independently of the lever in order that the load engaging rollers 3 and 8 may be readily applied to the load before the load is elevated. Such an adjustment of the rollers is illustrated in Figs. 1 and 2, the vehicle wheel 10 still remaining upon the floor. By turning the lever 13 clockwise the pawl carrier 19 is first elevated sufficiently to remove the pin 25 from engagement with the post 24 to permit the spring 23 to engage the pawl 18 with the rack 11, further movement of the lever forcing the load supporting rollers toward each other to lift the load.

As illustrated in Fig. 4, the rack is, in cross section, in the shape of an inverted T whose head and stem are in snug sliding engagement with the pawl carrier 19 whereby movement of the rack vertically with respect to the pawl carrier is prevented. Because of this engagement of the rack bar with the pawl carrier the pawl will force movement of the rack longitudinally of the side piece 2 as the lever is being turned clockwise and as the rack is pivotally connected with the movable load supporting member at 12 such member will be moved toward its companion member to elevate the load 10. When the load is to be lowered the lever is turned in a counter-clockwise direction to permit the rack teeth to escape the pawl and when the lever has been fully restored to its idle position the movable load supporting member may readily be separated sufficiently from the other load supporting member to enable the jack to be withdrawn laterally from the load.

When four of these jacks are in supporting relation to the four vehicle wheels of an automobile or other vehicle such vehicle may readily be shifted about from place to place where space for movement is limited. Where the jacks are constructed to have a plurality thereof used to elevate an automobile or a part of the automobile the side piece 2 is preferably made cylindrical and one or both of the load supporting elements are adapted to turn on said side piece so that the load supported by any one or more jacks is equally distributed on the load supporting elements. Any unevenness in the floor that an automobile may be pushed over is thus compensated for since the casters are free to seek the varying surfaces of the floor, these casters being mounted upon the load supporting elements rather than directly upon the side piece 2. In other words, by this preferred construction of the jack, any twisting or side strains are taken off the side pieces 2 as the casters encounter unevenness in the floor and all casters at all times retain their proper share of the load. I prefer to employ load engaging rollers when the loads to be supported are in the nature of vehicle or automobile wheels as these vehicle wheels may readily be turned or rotated by hand to adjust the brake bands which engage the brake drums on the wheels while the weight of the automobile is carried upon the jacks. I do not limit myself, however, to the employment of rollers for engaging the load that is to be supported.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A lifting jack including two load supporting members; a side piece connecting said load supporting members and along which one of the load supporting members is movable toward and from the other load supporting member; a rack bar connected with said movable load supporting member and extending longitudinally of the side piece; a lever having a fulcrum supported by the side piece; and a pawl engageable with the teeth of the rack bar and operable by said lever to draw the rack bar longitudinally of the side piece and thereby effect movement of said movable load supporting member longitudinally of the side piece.

2. A lifting jack including two load supporting members; a side piece connecting said load supporting members and along which one of the load supporting members is movable toward and from the other load supporting member; a rack bar pivotally connected with said movable load supporting member and extending longitudinally of the side piece; a lever having a fulcrum supported by the side piece; and a pawl engageable with the teeth of the rack bar and operable by said lever to draw the rack bar longitudinally of the side piece and thereby effect movement of said movable load supporting member longitudinally of the side piece.

3. A lifting jack including two load supporting members; a side piece connecting said load supporting members and along which one of the load supporting members is movable toward and from the other load supporting member; a rack bar connected with said movable load supporting member and extending longitudinally of the side piece; a lever having a fulcrum supported by the side piece; a pawl engageable with the teeth of the rack bar and operable by said lever to draw the rack bar longitudinally of the side piece and thereby effect movement of said movable load supporting member longitudinally of the side piece; and a pawl disengaging device adjusted to function by said lever when in idle position to normally disengage the pawl from the rack bar to permit said movable load supporting member to be moved longitudinally of said side piece independently of the lever.

4. A lifting jack including two load supporting members; a side piece connecting said load supporting members and along which one of the load supporting members is movable toward and from the other load supporting member; a rack bar pivotally connected with said movable load supporting member and extending longitudinally of the side piece; a lever having a fulcrum supported by the side piece; a pawl engageable with the teeth of the rack bar and operable by said lever to draw the rack bar longitudinally of the side piece and thereby effect movement of said movable load supporting member longitudinally of the side piece; and a pawl disengaging device adjusted to function by said lever when in idle position to normally disengage the pawl from the rack bar to permit said movable load supporting member to be moved longitudinally of said side piece independently of the lever.

5. A lifting jack including two load supporting members; a side piece connecting said load supporting members and along which one of the load supporting members is movable toward and from the other load supporting member; a bar connected with said movable load supporting members, a lever having a fulcrum supported by the side piece; and a bar engaging member operable by said lever to draw said bar longitudinally of the side piece and thereby effect movement of said movable load supporting member longitudinally of the side piece.

In witness whereof, I hereunto subscribe my name this sixteenth day of January, A. D. 1918.

HENRY E. MAURER, Jr.